United States Patent
Kanari et al.

(10) Patent No.: US 6,273,430 B1
(45) Date of Patent: *Aug. 14, 2001

(54) OIL SEAL

(75) Inventors: Issei Kanari, Kanagawa; Michiya Hiramoto, Yokohama, both of (JP)

(73) Assignee: Unisia Jecs Corporation, Atsugi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,543

(22) Filed: May 14, 1998

(30) Foreign Application Priority Data

May 29, 1997 (JP) .................................................. 9-139467

(51) Int. Cl.$^7$ .................................. F16J 9/28; F16J 15/56
(52) U.S. Cl. ............................ 277/439; 277/560; 277/565
(58) Field of Search .................................... 277/439, 549, 277/559, 560, 562, 565

(56) References Cited

U.S. PATENT DOCUMENTS

| | | | |
|---|---|---|---|
| 2,316,713 | * | 4/1943 | Procter . |
| 2,568,056 | * | 9/1951 | Corder . |
| 2,977,138 | * | 3/1961 | Brittain, Jr. . |
| 3,119,624 | * | 1/1964 | Freed . |
| 3,144,256 | * | 8/1964 | Wright . |
| 3,183,009 | * | 5/1965 | Kunel . |
| 3,368,650 | * | 2/1968 | Wasdell . |
| 4,061,346 | * | 12/1977 | Coleman et al. . |
| 4,534,239 | * | 8/1985 | Heimann . |
| 5,178,243 | * | 1/1993 | Hamada et al. . |
| 5,478,091 | * | 12/1995 | Gardner . |

FOREIGN PATENT DOCUMENTS 7-36210   8/1995   (JP) .

* cited by examiner

Primary Examiner—James R. Brittain
Assistant Examiner—John L. Beres
(74) Attorney, Agent, or Firm—Foley & Lardner

(57) ABSTRACT

An oil seal or fluid seal for providing a seal between a cylinder and a piston rod is provided. The oil seal has an annular seal lip which has on a conical inner circumferential surface thereof a plurality of annular projections which are arranged axially of the seal lip. One of the annular projections which is located more axially outside of the cylinder is larger in the height above the inner circumferential surface than one of the annular projections which is located more axially inside of the cylinder. By this, under a condition where the annular projections which are located more axially inside of the cylinder are subjected to a high pressure within the cylinder, the annular projections which are located more axially inside of the cylinder and the annular projections which are located more axially outside of the cylinder are nearly equal in the contact pressure against the piston rod, thus causing all of the annular projections to deform nearly equally. The annular projections are all brought into contact with the piston rod at nearly equal contact areas.

4 Claims, 6 Drawing Sheets

OIL SEAL

BACKGROUND OF THE INVENTION

1. Field of the Invention

The present invention relates to an oil seal for use in a gas spring, hydraulic shock absorber or the like device to provide a hermetic seal between a cylinder and a piston rod thereof.

2. Description of the Related Art

In a gas spring, a piston rod is reciprocally disposed in a cylinder. Within the cylinder is filled high pressure gas together with lube oil. Accordingly, at the end of the cylinder is provided a fluid seal or oil seal so as to provide a seal between the cylinder and the piston rod.

The oil seal has an annular seal lip extending radially inward so as to fit closely, at an inner circumferential surface thereof, the outer circumferential surface of the piston rod. In this instance, in order that the seal lip can prevent leakage of oil and gas assuredly, it needs to retain a predetermined contact pressure under which it is urged for contact with the piston rod. However, if it is tried to simply make higher the contact pressure of the seal lip, the contact area at which the seal lip is brought into contact with the piston rod is increased with increase of the contact pressure, thus causing the oil film covering the circumferential surface of the piston rod to be liable to be cut or removed by the seal lip at the time of movement of the piston rod relative to the oil seal. Thus, when the piston rod is out of lube oil, the resistance of the oil seal to movement of the piston rod increases while the lubrication at the seal lip becomes worse, thus deteriorating the durability of the oil seal.

From the foregoing reasons, an oil seal capable of solving such a problem has been proposed as is disclosed in Japanese utility model second publication (after examined) No. 7-36210.

This oil seal is shown in FIG. 5 and generally indicated by 1. The oil seal 1 includes an annular seal lip 2 having an inclined inner circumferential surface 3 which is inclined with respect to a center axis of the oil seal 1 when observed in a longitudinal section, i.e., the annular seal lip 2 has a conical inner circumferential surface 3. At the inner circumferential surface 3, the seal lip 1 is formed with a plurality of annular projections 4a to 4e which are arranged in sequence axially of the oil seal 1. The annular projections 4a to 4e have end portions brought into contact with the outer circumferential surface of the piston rod 5. Such an oil seal 1 can be higher in the contact pressure of each of the annular projections 4a to 4e but smaller in the continuous or consecutive contact surface area, thus allowing the oil film formed on the outer circumferential surface of the piston rod 5 to be hard to be cut or removed by the seal lip 2. In the meantime, in FIG. 5, indicated by 6 is a cylinder and by 7 is a metallic reinforcement ring attached to the oil seal 1.

However, in the above described oil seal 1, the annular projections 4a to 4e are formed so as to be simply of the same height above the inner circumferential surface 3. Thus, when the seal lip 2 is subjected to the high pressure within the cylinder 6, the annular projections 4a to 4e located axially more inside of the cylinder 6 receives more of the cylinder inside pressure. By this, the contact pressure of the annular projection 4a becomes larger as compared with those of the other annular projections. As a result, the annular projection 4a located axially more inside of the cylinder 6 is deformed axially outside of the cylinder 6 more largely and its contact area also becomes larger. For this reason, a problem of the prior art oil seal 1 is that when the cylinder inside pressure is high the annular projection 4a located axially more inside possibly cuts or removes the oil film on the outer circumferential surface of the piston rod 5.

SUMMARY OF DTHE INVENTION

According to an aspect of the present invention, there is provided a novel and improved oil seal which is attached to an end of a cylinder filled with high pressure fluid together with oil and having an annular seal lip slidably fitted on an outer circumferential surface of a piston rod which is reciprocal in while protruding from the cylinder. The seal lip has on an inner circumferential surface thereof a plurality of annular projections at which it is brought into contact with the outer circumferential surface of the piston rod. One of the annular projections which is located more axially outside of the cylinder is larger in the height above the inner circumferential surface than one of the annular projections which is located more axially inside of the cylinder. The annular projections which are located more axially inside of the cylinder are subjected to more of the high pressure within the cylinder. However, since the annular projections which are located more radially outside of the cylinder are larger in the height above the inner circumferential surface than those which are located more axially inside of the cylinder, the annular projections are all nearly equal in the contact pressure with respect to the piston rod. As a result, it never occurs such a case in which the amount of deformation of the annular projections which are located more axially inside of the cylinder becomes excessively large, thus causing all of the annular projections to become nearly equal in the contact area with respect to the piston while allowing the grooves in which oil is collected to be formed between adjacent two of the annular projections assuredly.

According to a further aspect of the present invention, the annular projections are variable in the height multi-stepwise in a way as to increase in the height in order from one that is located more axially inside to one that is located more axially outside of the cylinder By this, the annular projections all have a nearly equal surface area for contact with the piston rod.

It is accordingly an object of the present invention to provide a novel and improved fluid seal or oil seal which can assuredly prevent shortage or lack of its lube oil on the outer circumferential surface of a piston rod of a hydraulic device such as a gas spring, hydraulic shock absorber, etc.

It is a further aspect of the present invention to provide a novel and improved fluid seal or oil seal of the foregoing character which can improve its lubrication as well as the lubrication of the associated piston rod or the like and elongate its durability assuredly.

DETAILED DESCRIPTION OF THE PREFERRED EMBODIMENTS

Figure 1:
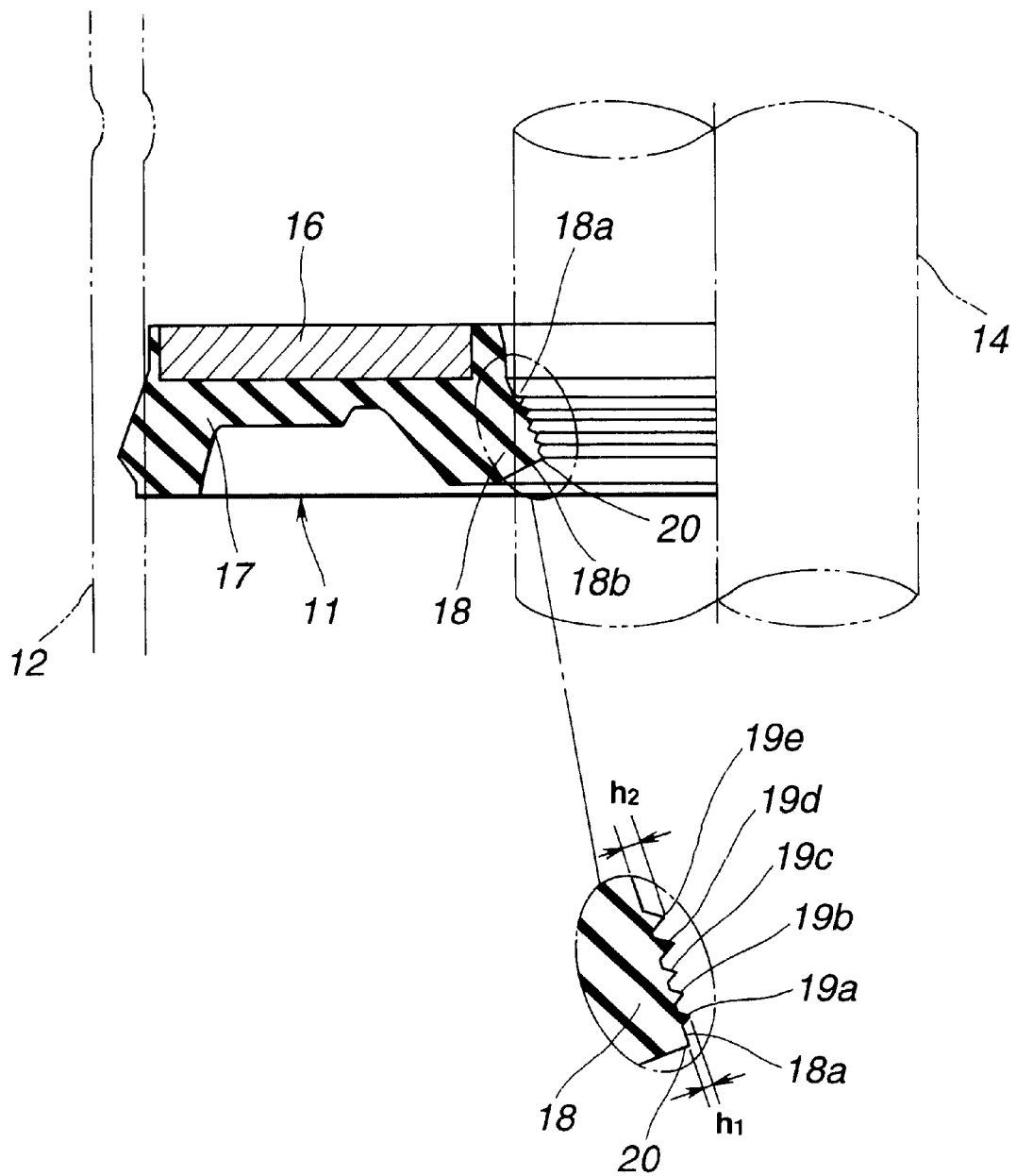
FIG. 1 is a half of a longitudinal section of an oil seal according to an embodiment of the present invention, together with an enlarged view of an important portion.
Figure 2:
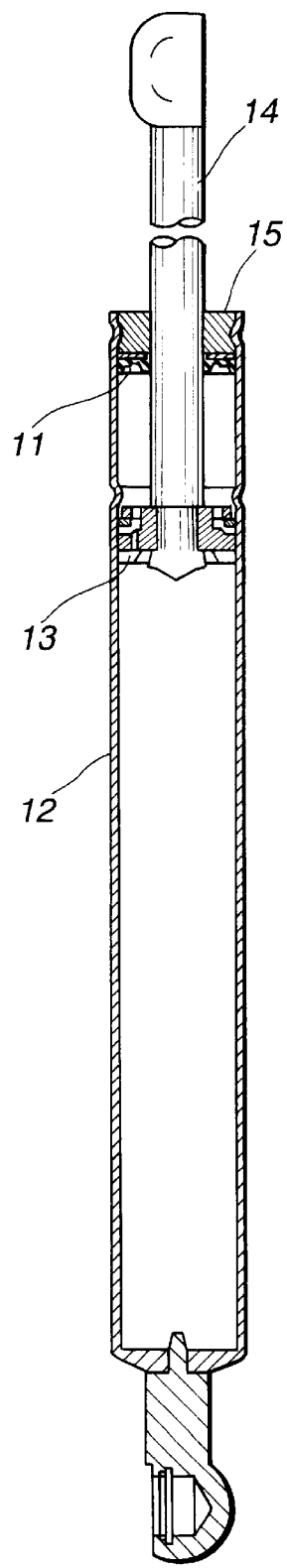
FIG. 2 is a longitudinal section of a gas spring incorporating the oil seal of FIG. 1.
Figure 3:
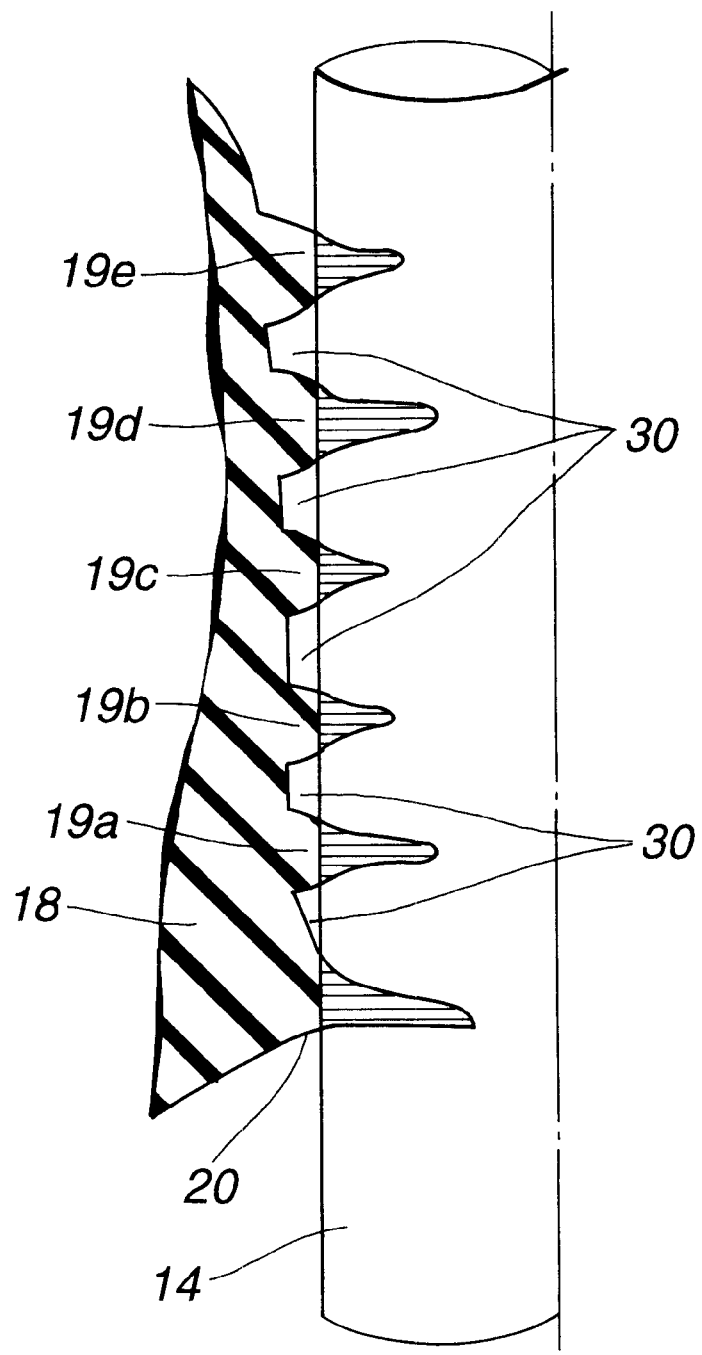
FIG. 3 is a schematic view for illustrating distribution of a contact pressure of the oil seal of FIG. 1.

Referring to FIGS. 1 to 3, inclusive, an oil seal or fluid seal according to the present invention will be described.

In FIG. 2, a gas spring which is so-called a gas stay and in which an oil seal 11 according to an embodiment of the present invention is incorporated, is shown as including a cylinder 12 in which high pressure or compressed gas is filled together with a small amount of lube oil, a piston 13 slidable in the cylinder 12, and a piston rod 14 having an inner end attached to the piston 13 and an outer end located outside of the cylinder 12.

The piston 13 is provided with a damping mechanism such as an orifice or orifices (no numeral). The outer end of the piston rod 14 and a fixing end of the cylinder 12 are connected to a stationary portion and movable portion of a mechanism such as a door opening and closing mechanism, respectively. Accordingly, the piston rod 14 assists movement of the movable portion of the associated mechanism by means of the gas pressure within the cylinder 12 while damping or supressing sudden or abrupt motion of the movable portion by means of the damping mechanism. Further, to an end portion of the cylinder 12 (i.e., an upper end in FIG. 2) is attached by caulking or the like a known rod guide 15 for guiding movement of the piston rod 11, in a way as to be placed axially upon the oil seal 11.

The oil seal 11 is made of rubber, resin or the like soft material and has a base portion 17 and an annular seal lip 18. As shown in FIG. 1, the base portion 17 has an outer circumferential surface to be fitted on an inner circumferential surface of an end portion of the cylinder 12. To an upper surface of the base portion 17, when observed in FIG. 1, is fitted and fixed a metallic reinforcement ring 16. The annular seal lip 18 extending radially inward from an inner circumference of the base portion 17. The seal lip 18 is shaped nearly triangular in cross section and includes a top 20 and a pair of inclined surfaces 18a and 18b which are located on the opposite sides of the top 20 when observed in a longitudinal section. The inclined surface 18a on the upper side of the top 20 when observed in FIG. 1 forms a smaller angle of inclination with respect to the center axis of the piston rod 14 as compared with that of the inclined surface 18b on the lower side so that the inclined surface 18a on the upper side is mainly brought into contact with the outer circumferential surface of the piston rod 14. In other words, the seal lip 18 has a pair of conical inner circumferential surfaces 18a and 18b which taper oppositely to form the top 20 therebetween.

The seal lip 18 has at the upper side inclined surface or conical circumferential surface 18a a plurality of annular projections 19a to 19e which are arranged in sequence axially of the oil seal 11. The annular projections 19a to 19e are brought into contact with the outer circumferential surface of the piston rod 14 in a way as to allow the piston rod 14 to be slidable relative thereto. Oil scraped or removed off from the outer circumferential surface of the piston rod 14 by the annular projections 19a to 19e is collected in grooves 30 (refer to FIG. 3) between adjacent two of the annular projections 19a to 19e.

The annular projections 19a to 19e are not equal in the height above the conical inner circumferential surface 18a but two 19d and 19e of the annular projections which are located more axially outside of the cylinder 12 than the others are of the height h2 which is larger than the height h1 of the remaining three annular projections 19a to 19c. The respective heights-above-the conical inner circumferential surface 18a of the annular projections 19a to 19e are determined so that the pressures under which the contact surfaces of all the annular projections 19a to 19e are urged or pressed against the outer circumferential surface of the piston rod 14 are nearly equal as shown in FIG. 3, specifically when the gas spring is in such a manufacturing step in which compressed gas has been filled in the cylinder 12 together with lube oil. That is, in a manufacturing step, compressed gas is filled in the cylinder 12 and applies a larger force to the annular projection 19a which is located more axially inside than others. The heights of the annular projections 19a to 19e are set so that the annular projections 19a to 19e under the urge of the compressed gas filled in the cylinder 12 are all nearly equal in the contact pressure.

Accordingly, in this oil seal 11, all of the annular projections 19a to 19e are deformed nearly equally and there never occurs such a case in which some of the annular projections 19a to 19e which are located more axially inside of the cylinder 12 become larger in contact surface area than others. For this reason, it becomes possible to assuredly prevent substantial scraping off or removal of oil from the outer surface of the piston rod 14 due to excessive increase in the contact surface area of the projection 19a, and furthermore it never occurs such a case in which the grooves 30 formed between adjacent two of the annular projections are flattened excessively, thus making it possible to supply lube oil to the end portion of each of the annular projections 19a to 19e assuredly. Accordingly, this makes it possible to reduce the resistance of the oil seal 11 to axial movement of the piston rod 14 and improve the lubrication and durability of the oil seal 11.

In the meantime, in this embodiment, the top of the seal lip 18 is brought into contact with the outer circumferential surface of the piston rod 14 together with the annular projections 19a to 19e as shown in FIG. 3. However, since the heights of the annular projections 19a to 19e are set as described above, it becomes also possible to make smaller the contact pressure and the contact surface area of the top 20. Further, there is also assuredly formed between the top 20 and its adjacent annular projection 19a a groove 30 for catching or collecting lube oil.

Figure 4:
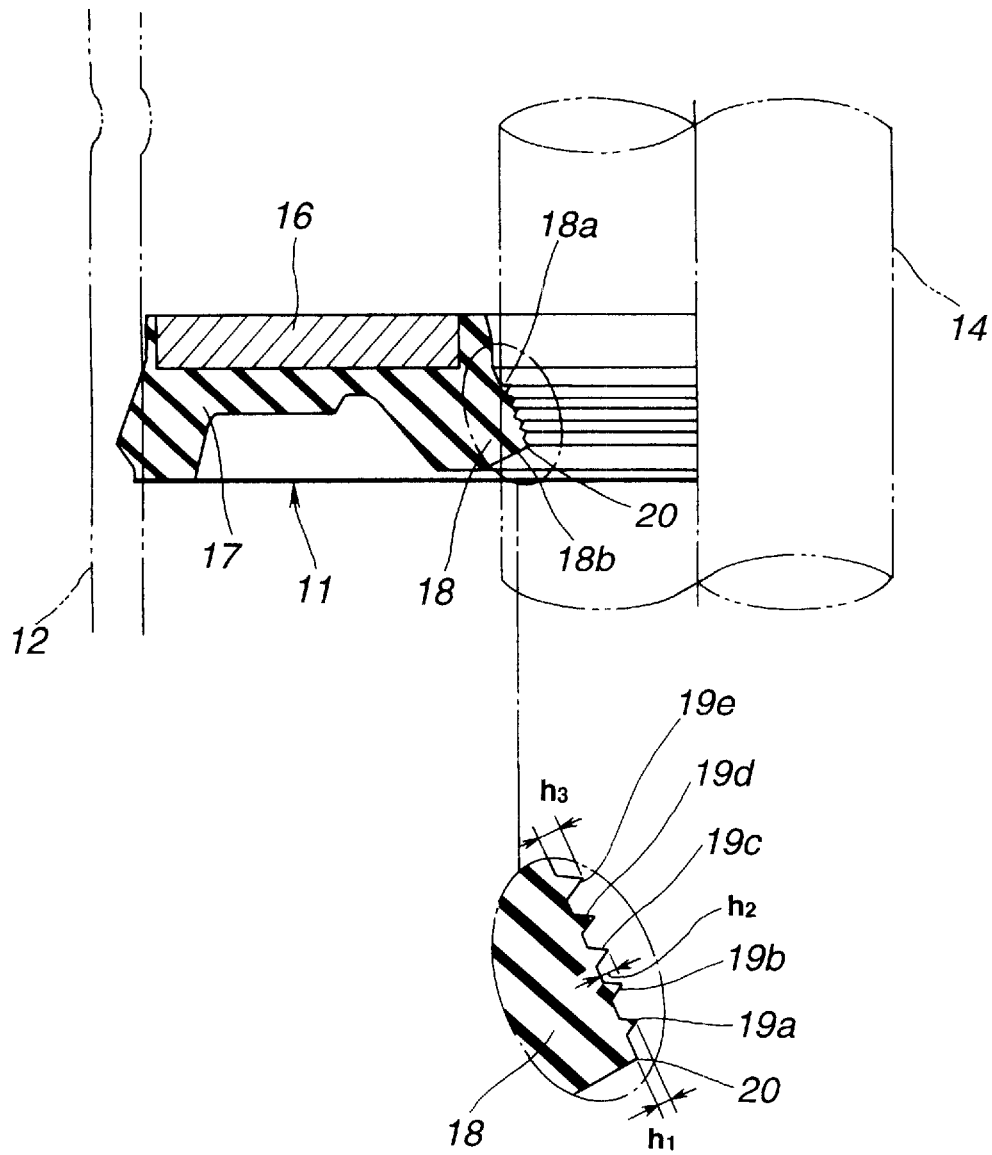
FIG. 4 is a view similar to FIG. 1 but shows another embodiment of the present invention.
Figure 5:
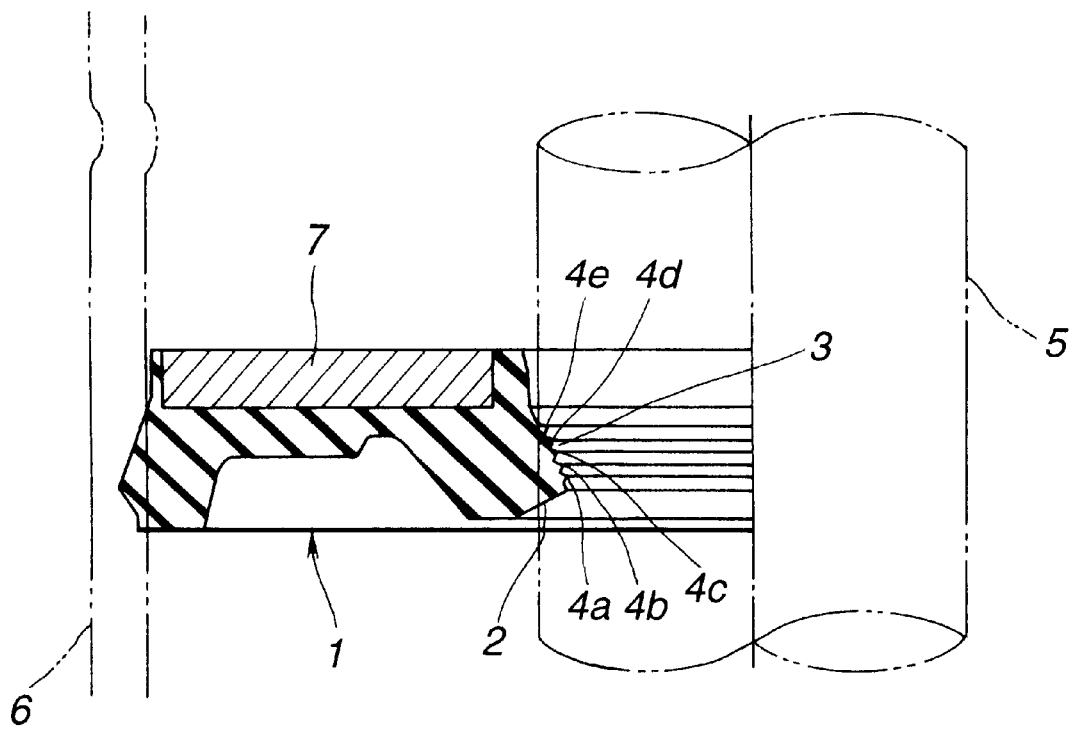
FIG. 5 is a half of a longitudinal section of a prior art oil seal.
Figure 6:
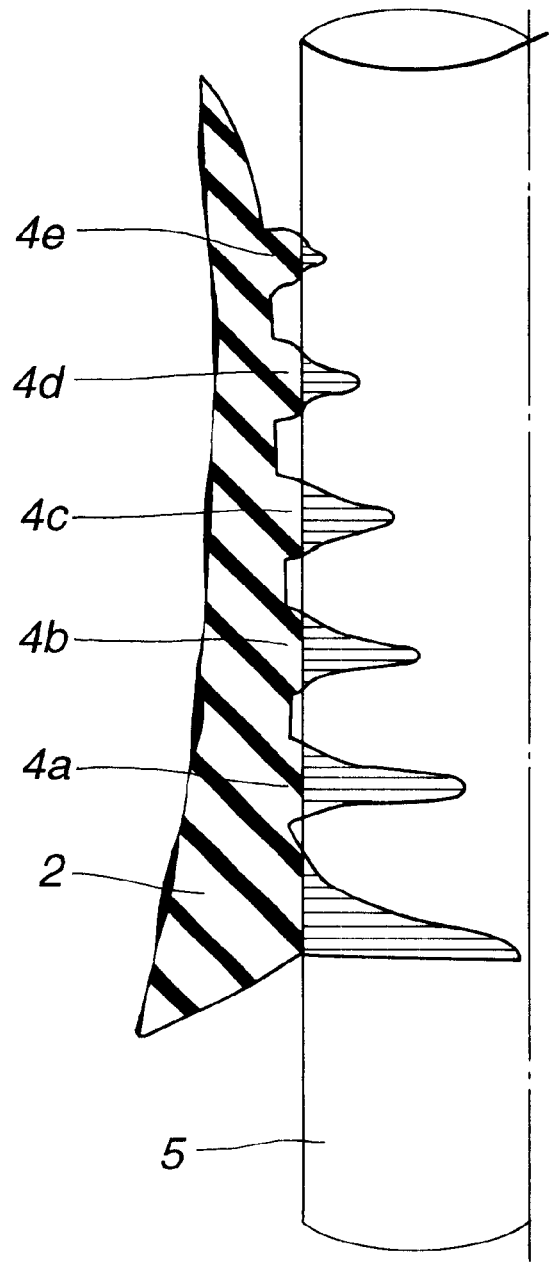
FIG. 6 is a schematic view for illustrating distribution of a contact pressure of the prior art oil seal of FIG. 5.

Further, in the above described embodiment, two annular projections 19d and 19e of the seal lip 18, which are located more axially outside than others, are constructed so as to be larger in the height above the conical inner circumferential surface 18a than the remaining annular projections 19a to 19c. However, as shown in FIG. 4, the seal lip 18 may be structured so that the annular projection 19e located most axially outside is of the largest height h3, the annular projection 19a located most axially inside is of the smallest height h1, and the annular projections 19b to 19d located between the annular projections 19a and 19e are of the height h2 intermediate between the heights h3 and h1. In case the annular projections 19a to 19e are constructed so as to vary in the height multi-stepwise in order of arrangement in the axial direction of the piston rod 14, the annular projections located more inside offset the influence of the gas pressure more effectively, thus enabling the annular projections 19a to 19e to have more uniform contact surface areas with respect to the piston rod 14.

While the oil seal of the present invention has been described and shown as being incorporated in a gas spring, this is not for the purpose of limitation but it can be used in a hydraulic shock absorber or the like device, such as a double-tube telescopic damper or single-tube damper to produce substantially the same effect.

What is claimed is:

1. An oil seal for providing a seal between a cylinder and a piston rod reciprocal in the cylinder, the oil seal comprising:

an annular base portion;

an annular oil seal lip protruding radially inward and slantwise from an inner circumferential end of said base portion for contact with an outer circumferential surface of the piston rod;

said annular oil seal lip having, when observed in section, a radially innermost top and an inclined surface extending from the inner circumferential end of said base portion to said top, said annular seal lip further having a plurality of annular projections arranged axially on said inclined surface, one of said annular projections axially more distant from the inner circumferential end of said base portion being smaller in height above said inclined surface than one of said annular projections axially less distant from the inner circumferential end of said base portion.

2. An oil seal according to claim 1, wherein said annular projections increase in said height multi-stepwise and in order from one axially remotest from the inner circumferential end of said base portion to one axially closest to the inner circumferential end of said base portion.

3. A fluid seal for providing a seal between a cylinder and a piston rod reciprocal in the cylinder, the fluid seal comprising:

an annular base portion;

an annular fluid seal lip to be placed around an outer circumferential surface of the piston rod, protruding radially inward and slantwise from an inner circumferential end of said base portion;

said annular fluid seal lip having, when observed in section, a radially innermost top and an inclined surface extending from the inner circumferential end of said base portion to said top, said annular fluid seal lip further having a plurality of annular projections for contact with the outer circumferential surface of the piston rod, said annular projections being arranged axially on said inclined surface, one of said annular projections axially more distant from said inner circumferential end of said base portion being smaller in height above said inclined surface than one of said annular projections axially less distant from the inner circumferential end of said base portion.

4. A fluid seal according to claim 3, wherein said annular projections increase in said height multi-stepwise and in order from one axially remotest from the inner circumferential end of said base portion to one axially closest to the inner circumferential end of said base portion.

* * * * *